United States Patent [19]

Siebol

[11] 4,407,619
[45] Oct. 4, 1983

[54] BLIND FASTENER WITH DEFORMABLE CLAMPING MEANS

[75] Inventor: George Siebol, Renton, Wash.

[73] Assignee: Olympic Fastening Systems, Downey, Calif.

[21] Appl. No.: 151,411

[22] Filed: May 19, 1980

Related U.S. Application Data

[63] Continuation-in-part of Ser. No. 77,344, Sep. 20, 1979, abandoned.

[51] Int. Cl.³ .............................................. F16B 00/00
[52] U.S. Cl. ........................................ 411/43; 411/69
[58] Field of Search .................... 85/77, 78, 73, 74, 75, 85/72, 70; 411/43, 70, 69; 29/512, 522 R

[56] References Cited

U.S. PATENT DOCUMENTS

| | | | |
|---|---|---|---|
| 3,285,121 | 11/1966 | Siebol | 85/78 X |
| 3,292,482 | 12/1966 | Fry et al. | 85/78 |
| 3,369,289 | 2/1968 | Gapp . | |
| 3,390,601 | 7/1968 | Summerlin | 85/78 |
| 3,489,056 | 1/1970 | Blakeley | 85/78 |
| 4,137,817 | 2/1979 | Siebol | 85/78 |
| 4,143,580 | 3/1979 | Luhm | 85/77 |

FOREIGN PATENT DOCUMENTS

| | | |
|---|---|---|
| 1066033 | 4/1967 | United Kingdom . |
| 1124749 | 8/1968 | United Kingdom . |
| 1145124 | 3/1969 | United Kingdom . |
| 1291162 | 10/1972 | United Kingdom . |

*Primary Examiner*—Ramon S. Britts
*Attorney, Agent, or Firm*—Fulwider, Patton, Rieber, Lee & Utecht

[57] ABSTRACT

A blind rivet with a deformable annular clamping ridge around the leading end of the expansion section of the setting pin, with a tapered leading face and a crest diameter a few thousandths of an inch larger than the inside diameter to which the sleeve of the rivet is to be expanded, thereby to provide a high momentary clamping force against the workpieces to be riveted, greater bearing area as a result of the greater initial effective diameter, and a better hole filling because of the excess material provided by the ridge. The ridge may be of the same material as the remainder of the head, to be deformed as an incident to wire-drawing elongation of the head, or may be a soft-coating applied to a harder core material. Alternatively, the ridge may be formed as part of a locking collar disposed about the setting pin, abutting the leading end of the expansion head, and including a forwardly projecting skirt that is deformable into a recess in the rivet head to lock the pin in place in the rivet sleeve when the rivet is set.

17 Claims, 11 Drawing Figures fig.5 fig.6 fig.7

BLIND FASTENER WITH DEFORMABLE CLAMPING MEANS

BACKGROUND OF THE INVENTION

This is a continuation-in-part of prior application Ser. No. 77,344, filed on Sept. 20, 1979, now abandoned.

This invention relates to so-called blind fasteners for joining side-by-side workpieces, typically two flat sheets to which access is convenient only from one side. The side of the work from which the fastener is installed is referred to as the front, outer or access side, and the other side is called the rear, inner or blind side.

One blind fastener of the general type to which the invention relates is described in U.S. Pat. No. 3,285,121 wherein it will be seen that the fastener comprises a headed sleeve that is telescoped over an elongated and specially formed setting pin having a pulling section that extends beyond the headed, access end of the sleeve, and an expanding and locking head that is positioned beyond the opposite, unheaded end of the sleeve. The expanding and locking head has an expansion section including an annular expanding shoulder adjacent the end of the sleeve, sized to enter the sleeve within the work, and a taper which progressively increases the size of the head beyond the expansion section.

With the fastener extending loosely through and beyond aligned holes in the workpieces, the setting pin is pulled from the access side of the work while the head on the access end of the sleeve is held against the work, causing the expanding and locking head to enter the blind-end portion of the sleeve. The expanding shoulder sets up an expansion wave in the sleeve and clamps the workpieces together, and then expands the sleeve into firm engagement with the walls of the holes in the workpieces, and the taper bulges the blind end portion of the sleeve into a bulb-shaped head against the blind side of the work. Then the expanding shoulder engages a stop inside the sleeve, and the pulling section is broken off at a weakening groove, substantially flush with the access-side head of the sleeve, and a locking means is set between the pin and the sleeve to hold the rivet in place.

The foregoing general description is applicable to numerous known blind fasteners of the rivet type, other examples being shown in U.S. Pat. Nos. 3,073,205; 3,377,908; and 4,012,984. Another category of blind fasteners is blind bolts, which are similar to blind rivets except that they usually are larger and their setting pins are threaded into their sleeves. The same general design principles apply to their expanding heads.

Tightness, strength and fatigue life of joints made with these fasteners depend in part upon the tensile and shear strengths of the fasteners, and in part upon the tightness of the clamping of the parts and the amount of bearing area that is developed between the blind-side sleeve head and the workpiece during setting of the fastener. To obtain relatively high bearing area while accommodating variations in the thickness of the workpieces within permissible tolerances, and to avoid splitting of the workpieces, the expanding heads of many blind fasteners have been made sufficiently ductile to stretch out, or wire draw, as they are pulled into the sleeves and into the holes of the workpieces, or have been structurally weakened from the blind-side end for controlled collapse of the larger end portion of the heads, as described in U.S. Pat. No. 4,137,817 entitled Blind Rivet With Recessed Expanding Head.

Despite these improvements, optimum strength and tightness have not been achieved, and a principal objective of this invention is to provide a further improved blind fastener which produces significantly better joints by more tightly clamping the workpieces together and more effectively filling the holes in the workpieces in the finished joint. A further objective of this invention is to attain these improved results without requiring a locking crown projecting outwardly from the access side of the rivet head, thereby decreasing the cost of manufacture of the blind rivet of this invention, and permitting the use of conventional installation tools.

SUMMARY OF THE INVENTION

The present invention resides in a blind fastener of the foregoing type having deformable clamping abutment means on the leading end portion of the expanding and locking head for momentarily resisting entry of the leading end portion into the blind-side workpiece and then yielding as the head is drawn into the workpieces. In this manner, the clamping abutment means produces a significant increase in the effective clamping force applied to the workpieces and then enhances the effectiveness of the head in expanding and holding the sleeve in tight engagement with the workpieces. In addition, the clamping abutment means contributes to the production of high blind-side bearing area by initiating bulging of the free end portion of the sleeve with a larger effective diameter than otherwise could be used.

In the preferred embodiment shown herein for purposes of illustration, the clamping abutment means comprises an annular ridge encircling the leading end portion of the expanding and locking head, immediately behind, and preferably an extension of, the expanding shoulder, and having a wedge-shaped or inclined leading surfaces. The ridge is composed of deformable material that is hard enough to enter and pass through the free-end portion of the sleeve without substantial deformation of the ridge, but soft enough to yield when the workpieces have been tightly clamped, and to counteract the tendency of the head to become smaller in cross-section due to elongation as it is drawn into the workpieces. In effect, the ridge provides excess material for maintaining the effective diameter of the portion of the head that enters the work, to insure that the holes are tightly filled by the head in the finished joint.

Depending upon the nature of the workpieces and the materials used for the sleeve and the setting pin, the clamping ridge may be formed in various ways. For example, it may be integral with, and the same material as, the remainder of the setting pin, this being the preferred construction, in which case deformation is believed to occur as a result of wire-drawing in the area of the ridge. Alternatively, it may be a shaped portion of a soft coating such as aluminum on a harder core material such as steel or high-strength aluminum alloy, this type of material being available as aluminum-clad wire. With such clad wire, deformation is believed to occur as a spreading and extruding of the coating, rather than as wire drawing of the entire pin.

In an alternative embodiment disclosed herein, the deformable ridge can be formed as an integral part of a locking collar which extends across or can be compressed into an annular locking groove in the stem. This locking collar surrounds the stem ahead of the locking groove and is arranged to abut the pressure element of the installation tool at the head of the rivet sleeve and buckle outwardly into a recess in the head of the rivet sleeve to lock the stem in place in the sleeve when installation of the rivet is complete. This alternative arrangement permits the blind fastener assembly of the present invention to be produced without a locking crown projecting outwardly from the rivet sleeve head, thereby reducing the cost of producing the fastener. Moreover, this alternative arrangement can be installed with any conventional blind rivet tooling head which is capable of pulling on the stem and exerting reaction pressure on the rivet head, thereby obviating the necessity of special installing tools.

Other aspects and advantages of the invention will be apparent from the following detailed description taken in conjunction with the accompanying drawings.

DETAILED DESCRIPTION OF THE PREFERRED EMBODIMENTS

As shown in the drawings for purposes of illustration, the invention is embodied in a blind rivet, indicated generally by the reference number 10, for joining two workpieces, herein flat sheets 11 and 12, where access is convenient from only one side, the right-hand side in FIGS. 1–4. Such rivets are usable, however, in other environments, where rapid assembly is important.

In general, the rivet 10 comprises a headed sleeve 13 and a setting pin 14 which are telescoped together and inserted loosely through two aligned holes 15 and 17 in the workpieces, the rivet, before setting, being smaller than the holes. After insertion, the rivet is set in the work by pulling the setting pin to the right while the sleeve is held stationary against the access-side workpiece 11. This motion of the setting pin 14 pulls an expanding and locking head, indicated generally at 18, into the blind-side end of the sleeve 13 to clamp the workpieces together, expand the sleeve into tight engagement with the walls of the holes 15 and 17, and form the blind-side end portion of the sleeve into a bulb-shaped head 19 (FIG. 4) which abuts against the blind-side workpiece 12 and cooperates with a preformed head 20 on the opposite end of the sleeve to clamp the workpieces together.

Figures 1, 2:
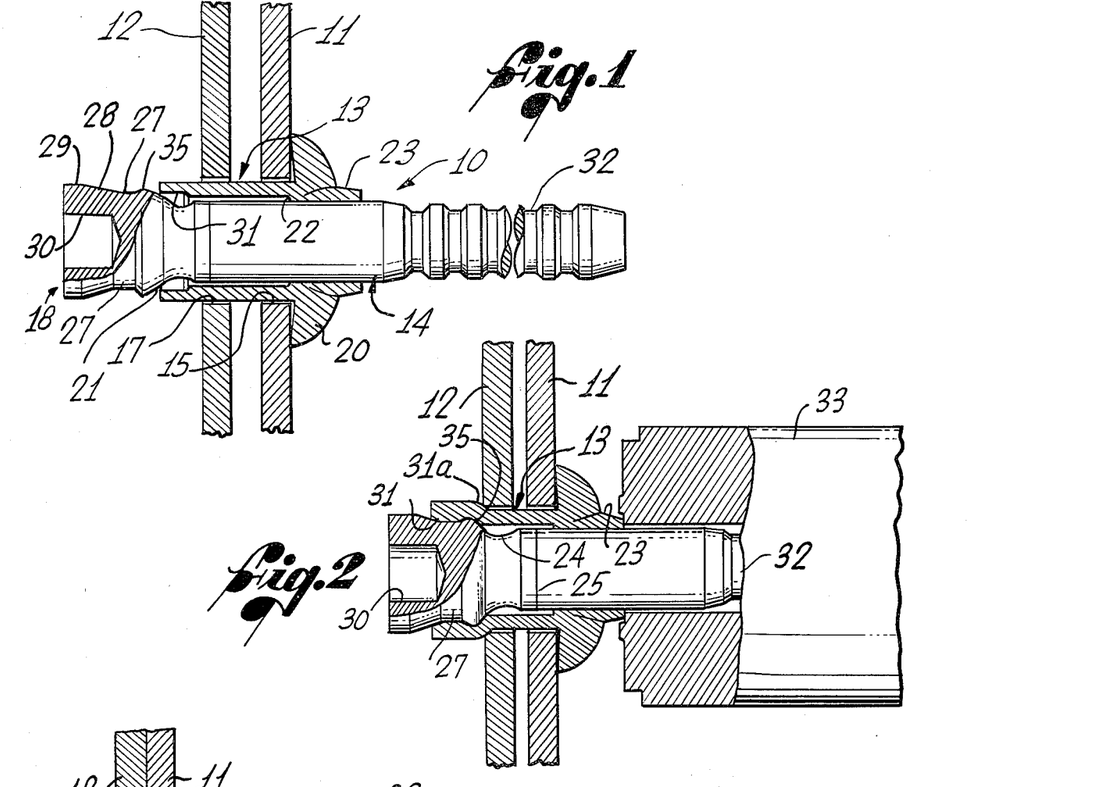
FIG. 1 is an enlarged side view of a blind rivet embodying the novel features of the invention, the rivet being shown before setting, with the sleeve in cross-section positioned in two representative workpieces, also shown in cross-section, and the setting pin shown in side elevation but with part of the expanding and locking head broken away and shown in cross-section, and with part of the pulling section cut away for compactness of illustration.
FIG. 2 is a view similar to FIG. 1 but with the pulling section of the setting pin gripped in a setting tool that is partly broken away and shown in cross-section, and with the expanding and locking head pulled partially into the sleeve to begin clamping the workpieces together.
Figure 3:
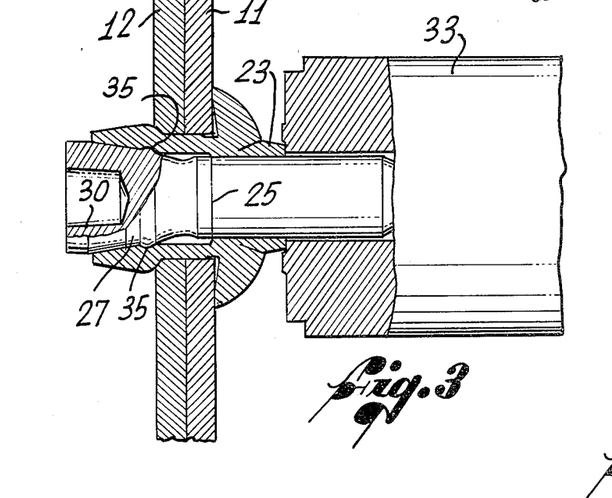
FIG. 3 is a view similar to FIG. 2 showing the condition of the parts as clamping is completed and formation of the blind-side head is underway.
Figure 4:
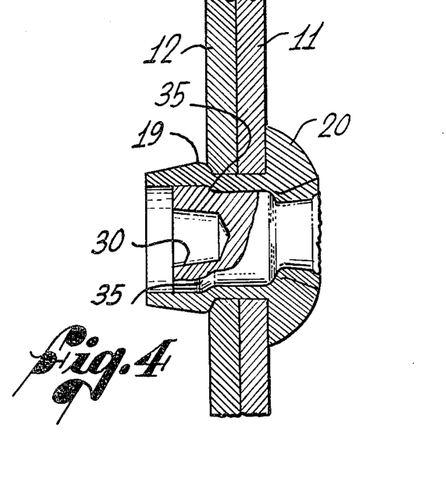
FIG. 4 is a view similar to FIG. 3 showing the completed joint.

As the clamping and head forming operations are completed, an inclined or tapered expanding shoulder 21 forming the leading end of the expanding head 18 engages an internal stop in the sleeve, herein a shoulder 22 formed on the inside wall of the sleeve, and a locking means is set. The illustrative locking means is a crown 23 integrally joined to the sleeve head 20, and is pressed into a locking groove 24 in the setting pin in front of the stop shoulder 22. At the same time, the setting pin is broken off at a weakening groove 25, substantially flush with the outer side of the sleeve head 20, as shown in FIG. 4 and the joint is completed.

The illustrative expanding and locking head 18 has a basically conventional configuration, being smaller in outside diameter than the holes 15 and 17, and increasing in size from a size smaller than the opening into the blind-side end of the sleeve at its leading end, to a size substantially larger than the interior of the sleeve, and including an expansion section formed by the expanding shoulder 21, and a relatively short, generally cylindrical portion 27 which varies in length according to the thickness of the workpieces for which the rivet is designed, the cylindrical portion being larger than the initial inside diameter of the sleeve 13 by an amount sufficient to expand the sleeve into engagement with the walls of the holes 15 and 17. When the sleeve is expanded, its expanded inside diameter (I.D.) is substantially the same as the outside diameter (O.D.) of the expansion section.

Beyond the cylindrical portion 27 are a conical taper 28 which increases the size of the head progressively from the expansion section toward the free, blind-side end of the head, and a short end portion 29. A weakening recess 30 is formed in the blind-side end of the illustrative head, as shown in U.S. Pat. No. 4,137,817 for controlled collapse of the large end portion of the head during setting of the rivet.

The illustrative sleeve 13 is of a conventional configuration, the head 20 being of the protruding type although countersunk heads (not shown) also are used. Beyond the head, the body of the sleeve is cylincrical and initially smaller in diameter than the diameter of the holes 15 and 17, for free insertion into the workpieces, and the projecting, blind-side end of the sleeve preferably has a counter bore 31 facilitating entry of the expanding shoulder 21.

Preparatory to the setting operation, the projecting end portion 32 of the setting pin 14 on the access side of the workpieces 11 and 12, called the pulling section, is gripped between a set of jaws (not shown) in a tool head 33, and the adjacent end of the tool head is pressed against the locking crown 23 to seat the sleeve head against the access-side workpiece 11. Then the setting pin is pulled through the sleeve, to the right as viewed in FIGS. 1 through 3, while the sleeve is restrained by the tool head against movement to the right, thus drawing the expanding and locking head 18 into the blind end of the sleeve.

As the expanding shoulder 21 passes from the counterbore 31 into the sleeve 13, an expansion wave 31a (FIG. 2) is set up in the sleeve and progresses along the sleeve with the shoulder. Upon engagement of this wave with the blind-side workpiece 12, it shifts the workpiece 12 to the right and cooperates with the tool head 33 in clamping the workpieces tightly together.

Then, when further movement of the blind-side workpiece 12 is prevented by the access-side workpiece 11, the expanding shoulder 21 is pulled into the portion of the sleeve 13 within the workpieces, and expands the sleeve to fill the holes 15 and 17. As the shoulder continues through the sleeve and across the shear plane between the workpieces, until it abuts against the stop shoulder 22 inside the sleeve, the tapered portion 28 of the expanding and locking head 18 is pulled into the blind-side end of the sleeve, forcing the latter toward the blind-side workpiece and producing a pronounced upset or bulge in the sleeve, against the workpiece.

Such bulging continues as the taper 28 is drawn into the sleeve 13, and typically is accompanied by yielding or wire-drawing deformation of the expanding and locking head 18, sometimes with partial radial collapse of the blind-end portion of the head when a weakening recess 30 is provided. This deformation of the head enables the setting pin 14 to accommodate variations in the combined thicknesses of the workpieces while producing good bearing area between the bulb-shaped blind-side head 19 (FIG. 4) and the workpiece 12.

Upon engagement of the expanding shoulder 21 with the stop shoulder 22, further movement of the setting pin through the sleeve 13 is stopped, and continued pulling of the pin first forces the locking crown 23 into the locking groove 24 and then snaps off the pulling section 32 at the weakening groove 25. This completes the setting of the rivet, generally in the condition shown in FIG. 4.

In accordance with the present invention, the expanding and locking head 18 has deformable clamping abutment means on its leading end portion for increasing the initial expanding and clamping diameter beyond that of the expansion section, and then yielding to permit the following surface of the expanding and locking head to enter the workpieces, initially producing a significant increase in the effective clamping force applied to the workpieces and, subsequently providing an excess of material for counteracting the tendency of the head to become smaller, and thereby insuring tighter filling of the sleeve inside the workpieces. Because of the larger initial effective diameter of the clamping means and the resulting increase in the expansion wave, the blind-side bearing area also is increased by this improvement.

More specifically, the clamping abutment means of the preferred embodiment comprises an annular ridge 35 having a wedge-shaped leading surface that tapers toward the workpieces from a maximum outside diameter at a crest 35a (FIGS. 5 and 6) that is larger than the expanded I. D. of the sleeve 13. Thus, this ridge cannot enter the portion of the sleeve that is inside the blind-side workpiece 12 without deforming, and it therefore provides a more positive clamping action for shifting the blind-side workpiece along the sleeve and into tightly clamped engagement with the access-side workpiece 11 as it is drawn into the sleeve with the expanding shoulder.

The clamping ridge 35 is composed of material that is hard enough to enter and pass through the free-end portion of the sleeve 13 without substantial deformation of the ridge, and to set up an expansion wave of a size determined by the O. D. of the ridge, but capable of yielding after the workpieces have been clamped together, and the increased resistance offered by the clamped workpieces is encountered. This yielding occurs as an incident to the drawing of the leading portion of the head into the holes in the workpieces, and thus is controlled by the holes, which shape the deformed head to the proper fit in the work, thus ensuring that the holes are tightly filled by the head, despite any tendency of the head to become reduced in size as a result of wire-drawing elongation during the setting operation.

Figure 5:
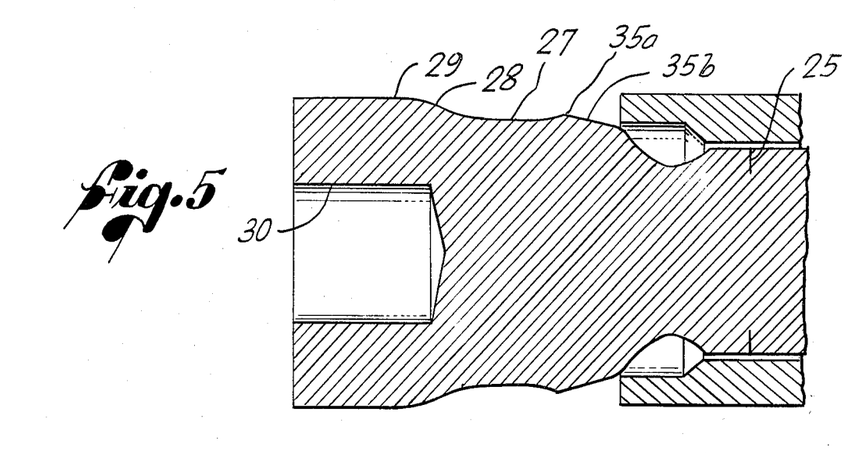
FIG. 5 is an enlarged fragmentary cross-sectional view taken longitudinally through the expanding and locking head and the sleeve end with the parts positioned as in FIG. 1.
Figure 6:
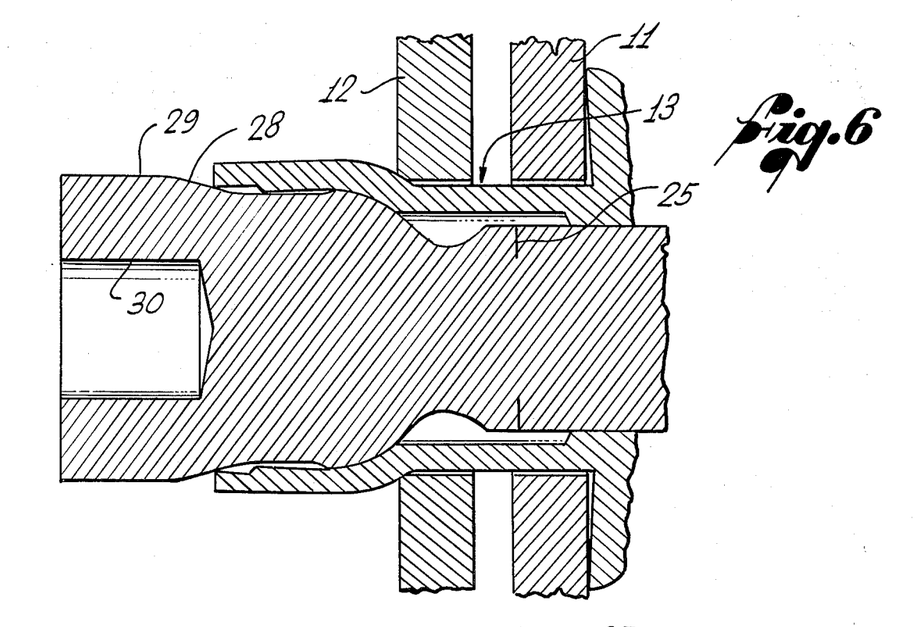
FIG. 6 is a view similar to FIG. 5 illustrating the condition of the parts in FIG. 2.
Figure 7:
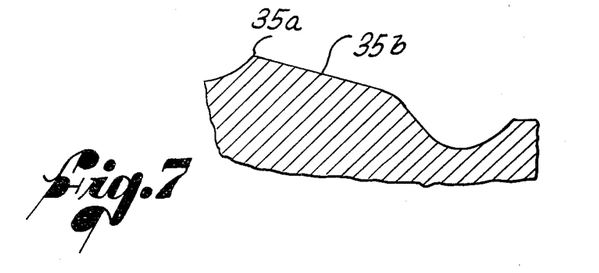
FIG. 7 is a greatly enlarged fragmentary cross-sectional view showing the configuration of the clamping ridge.

As can be seen most clearly in FIGS. 5, 6 and 7, the preferred clamping ridge 35 has a front face 35b forming an included angle that is an effective extrusion angle, preferably on the order of thirty degrees (that is, fifteen degrees on each side with the longitudinal axis of the setting pin 14, as viewed in cross-section). The crest diameter is substantially larger than the expanded I. D. of the sleeve 13 (the hole size less twice the wall thickness of the sleeve), the specific amount by which the ridge is oversize being variable according to the properties of the workpieces and the materials used to form the sleeve and the ridge, the amount of clamping desired, the amount of elongation that results from wire drawing, and the amount of a particular deformable material that can be drawn off without damaging the sleeve or the workpieces.

For each size and type of rivet in which the invention is to be used, the specific dimensions of the crest 35a can be determined empirically, following the general principles illustrated and described herein, the presently preferred proportions being shown in FIGS. 5 and 6. Once a satisfactory set of dimensions for the ridge 35 has been determined for a given rivet in a series of sizes, the ridges of other sizes of rivets can be determined, generally in a straight-line relationship.

As an example, in designing the clamping ridge 35 for a rivet of the type sold by Olympic Fastening Systems, Inc., Downey, Calif., as PB 1020-05-01, having an expansion section with an O. D. of 0.140 of an inch, a ridge of about 0.006 of an inch thickness (on the order of 0.012 of an inch in diameter) can be added. This makes the ridge oversize by about 0.011 of an inch when the hole 17 in the blind-size workpiece 12 is of maximum size within permissible tolerances, and about 0.015 of an inch oversize when the hole is of minimum size with permissible tolerances. In any event, a deformable clamping ridge of only a few thousandths of an inch thickness will produce significantly improved clamping and tighter hole filling, as well as a larger expansion wave for improved blind-side bearing area.

It is to be noted that the clamping ridge 35 is not simply an enlargement of the overall outside diameter of the expansion section 27. Behind the ridge, the cylindrical portion has the same initial diameter as in conventional designs, and is conventionally sized to hold the sleeve in its expanded condition, with an O. D. that is less than the hole size by an amount equal to twice the wall thickness of the sleeve. Thus, behind the ridge, there is a relief area that has an outside diameter conventionally designed to fill the expanded sleeve. Of course, if the expansion section is very short, this relief may overlie the smaller end portion of the taper 28.

While the preferred wedge shape for the leading face of the ridge 35 is a frusto-conical shape, other wedge shapes can be used. A longitudinal curvature, for example, either concave or convex in longitudinal cross-section, will produce similar ultimate results, so long as the leading face increases progressively in diameter toward the crest.

A number of different materials may be used for rivet parts and the clamping ridge 35, or stated another way, the clamping ridge may be applied in different ways to a variety of different rivets. For example, the ridge may be composed of the same material as the remainder of the setting pin 14, such as 2217, 2219, or 2023 aluminum alloy, with a sleeve of the same material. Particularly significant strength of the overall rivet can be achieved in an all-aluminum part, using a recently developed 7075 aluminum alloy. It is to be kept in mind, however, that the amount by which the ridge may be oversize is determined by the ability to draw off the ridge after the workpieces have been clamped together.

Another example, providing a relatively easily deformable clamping ridge for use in low-strength workpieces, uses aluminum clad wire with a 7075 aluminum alloy core coated with pure aluminum or 1100 aluminum alloy. With such materials, the coating may be shaped to form the clamping ridge around the harder core material, for relatively high overall strength despite the easy deformability of the ridge. A similar result may be obtained by applying a relatively soft coating to the expanding head alone, and shaping this coating to form the clamping ridge.

Figure 8:
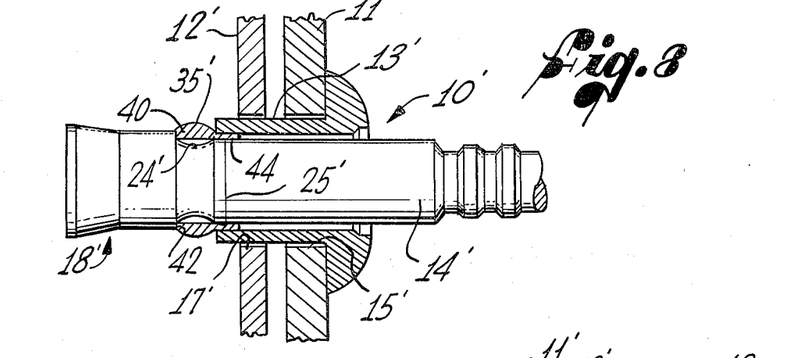
FIG. 8 is an enlarged side view, similar to the view of FIG. 1, but illustrating a blind rivet embodying an alternative embodiment of the invention.
Figure 9:
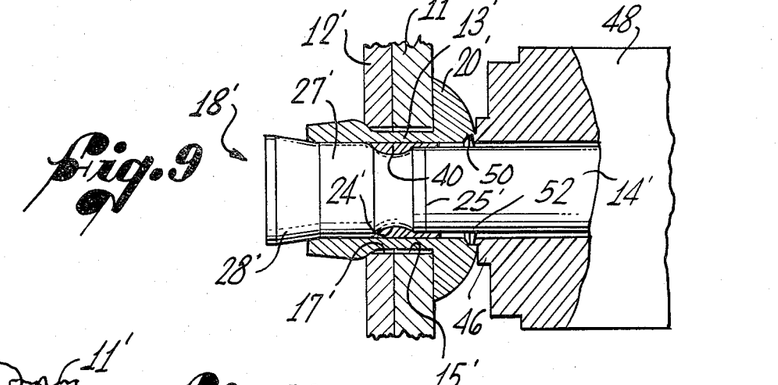
FIG. 9 is a view similar to FIG. 3 but showing the alternative embodiment of the invention illustrated in FIG. 8 as clamping of the workpieces is completed and formation of the blind-side head is underway.
Figures 10, 11:
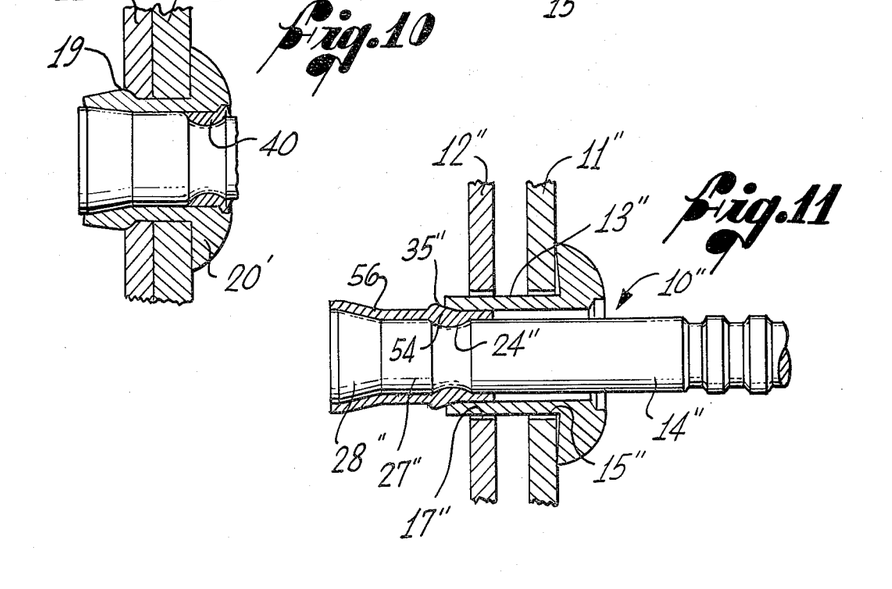
FIG. 10 is a view similar to FIG. 9 and showing the completed joint formed by the alternative embodiment of the invention.
FIG. 11 is a side view, similar to the views of FIGS. 1 and 8, but illustrating a blind rivet embodying another alternative embodiment of the invention.

An alternative embodiment of the present invention is shown, for purposes of illustration, in FIGS. 8, 9, and 10. In this instance, the rivet 10' is also of the blind fastener type somewhat similar to that previously discussed in connection with the rivet 10 of FIGS. 1 through 7, and parts of the rivet of FIGS. 8 through 10, which find substantial correspondence in structure and function to those previously discussed in connection with FIGS. 1 through 7, have been designated with corresponding primed reference numerals.

As can best be seen in FIG. 8, the rivet 10' is comprised of a headed sleeve 13' and a setting pin 14' which are inserted through the holes 15' and 17' in the workpieces 11' and 12'. However, the annular clamping ridge 35' is formed on an annular collar 40 which is disposed over the setting pin 14' and bears against a shoulder 42 at the leading end of the expanding and locking head 18'.

The collar 40 overlies the locking groove 24' and further includes an annular skirt 44 which extends forwardly of the locking groove 24' and overlies the weakening groove 25'. The outside diameter of the skirt 44 at the leading end thereof must be small enough to enter the free end of the sleeve 13', and the skirt is preferably of sufficient length to extend into the hole 17' in the blind side sheet 12' before the expansion wave reaches the blind side sheet 12'.

When installing the blind rivet 10', the clamping ridge 35' expands the face end of the sleeve 13' forming an expansion wave which clamps the sheets 11' and 12' together as described above. As the clamping ridge 35' is drawn into the hole 17' in the blind sheet 12', the ridge is displaced inwardly into the locking groove 24', as can best be seen in FIG. 9. Upon drawing the setting pin 14' further into the sleeve 13', the cylindrical portion 27' of the expanding and locking head 18' expands the sleeve 13' into engagement with the walls of the holes 15' and 17', and the tapered portion 28' of the head 18' forms the bulb-shaped blind side head 19' (FIG. 10) which provides enhanced bearing area against the workpiece 12'.

Further movement of the setting pin 14' draws the leading end of the collar 40 into engagement with a pressure element 46 on a conventional installation tool 48. Upon contacting the pressure element 46, the leading end of the skirt 44 is deflected inwardly toward the setting pin 14', and the remainder of the skirt 44 buckles outwardly into a recess 50 formed in the head 20' of the sleeve 13'. In this deformed position, the collar 40 resists further compression sufficiently to break the setting pin at the weakening groove 25' placing the rivet 10' in its fully installed position as illustrated, for example, in FIG. 10.

The above described installation sequence will function satisfactorily using an installation tool having a conventional flat-faced pressure element. If desired, however, the pressure element 46 can be provided with an inwardly directed bevel 52 to facilitate the initial inward deflection of the leading end of the skirt 44, as described above. This initial inward deflection and its attendant outward buckling of the skirt into the recess 50 is preferred because this configuration of the fully installed collar 40 provides better resistance to withdrawal than mere flanging outwardly of the skirt into the recess 50. Further, if desired, the face of the pressure element can project slightly into the recess 50 so that the fully installed skirt 44 does not project above the top of the head 20' of the sleeve (FIG. 10).

Another alternative embodiment of the present invention is shown, for purposes of illustration, in FIG. 11. In this instance, the rivet 10" is also of the blind fastener type somewhat similar to that previously discussed in connection with the rivets 10 and 10' of FIGS. 1 through 10, and parts of the rivet of FIG. 11, which find substantial correspondence in structure and function to those previously discussed in connection with FIGS. 1 through 10, have been designated with corresponding double-primed reference numerals.

In the embodiment illustrated in FIG. 11, the rivet 10" includes a headed sleeve 13" and a setting pin 14" which are inserted through holes 15" and 17" in the workpieces 11" and 12". The annular clamping ridge 35" is formed on a locking collar 54 which is pre-shaped, positioned on the pin 14", and compressed or swaged into place.

It will be noted that in this embodiment, the collar 54 is compressed into the locking groove 24" before installation of the rivet 10" into the workpieces 11" and 12". Also, if desired, the collar 54 can include an elongated rear sleeve portion 56 which forms a coating about the cylindrical portion 27" and tapered portion 28" of the setting pin 14". The elongated sleeve 56 can be provided to form a ductile coating on the expansion head for wire-drawing into the rivet sleeve 13" and ensuring a tight fit between the sleeve 13" and the holes 15" and 17".

In both of the alternative embodiments described above, the locking collars 40 and 54 can be formed of the same material as the rivet sleeves 13' and 13", respectively, or the locking collars can be formed of a material that is harder than the sleeve with which they are used. However, the collars must not be softer than the rivet sleeves. Further, the collars must be formed of a material that is softer than the setting pin 14' or 14" with which they are used.

With rivets designed in accordance with the present invention, it has been found that the clamping loads are increased as much as four or five times the loads obtained without a clamping ridge, and that lightweight, all-aluminum rivets composed of 7075 alloy will approach, and probably surpass, strengths that previously were achievable only with fasteners composed at least in part of much heavier materials. The increased strengths are attributed to (1) significantly increased forces achieved during clamping, (2) tighter hole-filling resulting from the excess material available in the clamping ridge or locking collars to counteract the effects of wire-drawing, and (3) increased blind-side bearing area or upset of the sleeve resulting from the initially larger clamping diameter. Moreover, the alternative embodiments of the invention disclosed herein attain these improved results without requiring a locking crown on the rivet head, thereby permitting the use of conventional installation tools.

While the invention is particularly well-suited for use in all-aluminum rivets, it also can be incorporated in fasteners composed of other materials, including monel and alloy steel, for correspondingly increased effectiveness. With the increased use of blind fasteners in structural areas, as opposed to mere sheet fastening, the achievable increases in strength are very significant.

From the foregoing, it should be evident that the present invention constitutes a significant advance in the blind fastener field, significantly increasing the clamping effectiveness of the rivet during the setting operation and also providing materially increased tightness of the completed joint. It also should be evident that, while a particular embodiment has been illustrated and described, various modifications and changes may be made without departing from the spirit and scope of the invention.

I claim as my invention:

1. In a blind fastener for joining side-by-side workpieces having aligned holes of a first predetermined diameter for receiving the fastener, and having:
   a tubular sleeve having an outside diameter sized to fit through said holes and having a first head at one end for abutting against one side of the workpieces, and an opposite end portion for projecting beyond the other side of the workpieces to be expanded against the workpieces into a second head on said other side;
   a setting pin extending through said sleeve for use in expanding said opposite end portion to clamp the workpieces together and form said second head, said setting pin having:
   a central section smaller than the inside of said sleeve;
   a pulling section on one end of said central section extending beyond said first head;
   and an expanding head on the other end of said central section beyond said other end of said sleeve, to be drawn into said sleeve, said expanding head having a cylindrical expansion section joined to said central section and larger than said central section and the inside diameter of said sleeve, formed with a tapered leading end adjacent said opposite end portion, said expansion section having an outside diameter that is less than the size of said holes by an amount equal to twice the wall thickness of said sleeve, to expand the sleeve into, and hold it in, tight engagement with the workpieces;
   and a tapered portion beyond said expansion section progressively increasing the size of said expanding head from said expansion section toward said other end, to form said second head on said sleeve;
   the improvement comprising:
   a deformable annular clamping ridge encircling the leading end portion of said expansion section, and having a tapered leading face forming an included angle of approximately thirty degrees with the longitudinal axis of the setting pin, and having a crest with an outside diameter that is slightly larger than the diameter of said expansion section to define a relief area portion of said expansion section between said ridge and said tapered portion and having a diameter slightly less than the outside diameter of said crest, thereby to resist entry of said expansion section into said sleeve and composed of material that is sufficiently strong to expand the sleeve beyond the workpieces without substantial deformation of the ridge, said crest being formed from a material that is sufficiently soft for deforming when the workpieces are clamped together and being drawn off into the space between the relief area portion and said tubular sleeve to permit the expansion section to enter and fill tightly the portion of the sleeve that is inside the workpieces.

2. A blind fastener as defined in claim 1 wherein said clamping ridge is composed of relatively soft aluminum material.

3. A blind fastener as defined in claim 1 wherein said clamping ridge has a crest diameter on the order of 0.012 of an inch larger than the diameter of said expansion section.

4. In a blind fastener for joining side-by-side workpieces having aligned holes for receiving the fastener, and including a tubular sleeve for extending through and beyond the holes, and a setting pin extending through the sleeve and having an expanding head at one end for expanding the sleeve into engagement with the workpieces, the expanding head including an expansion section for holding the expanded sleeve in engagement with the workpieces and a tapered portion at the end of the expansion section opposite the setting pin and progressively increasing the diametric size of the expanding head from the expansion section,
   the improvement comprising:
   a deformable clamping abutment ridge adjacent the leading end of said expansion section, said ridge having an outside diameter slightly larger than the outside diameter of said expansion section and cooperating with said tapered portion to define a relief area portion of said expansion section between said ridge and said tapered portion and having an outside diameter slightly less than the outside diameter of said ridge, said ridge being formed from a material sufficiently hard for enlarging the sleeve beyond the holes to a size larger than said expansion section and for momentarily resisting entry of said expansion section into the portion of the sleeve within the workpieces, thereby to clamp the workpieces tightly together as the expanding head is drawn into the sleeve, said material being sufficiently soft to deform when the workpieces are clamped together and draw off into and fill the space between said relief area portion and said tubular sleeve as the expansion section is drawn into the portion of the sleeve inside the holes.

5. In a fastener for joining two side-by-side workpieces having aligned holes of a predetermined size for receiving the fastener, the combination of:

a tubular sleeve having an outside diameter smaller than said predetermined size for insertion through said holes;

and a setting pin extending through said sleeve and having an expanding head adjacent one end of the sleeve to be pulled into the latter;

said expanding head having a generally cylindrical expansion section larger than the inside diameter of said sleeve, with a tapered leading end to expand the sleeve for clinching of the workpieces and tight filling of the holes, and having a tapered portion beyond said expansion section with a diameter greater than said expansion section for bulging the sleeve into a head against the workpieces;

and an annular clamping ridge on the leading end portion of said expansion section, having a tapered leading face and a crest having a slightly larger diameter than said expansion section to define a relief area portion of said expansion section between said ridge and said tapered portion and having an outside diameter slightly less than the outside diameter of said crest, said ridge being composed of material that is sufficiently hard to expand the portion of said sleeve beyond the workpieces without substantial deformation of the ridge to clamp the workpieces tightly together, said material being sufficiently soft to deform when the workpieces are clamped together and draw off as the ridge is pulled into the portion of the sleeve within the workpieces, whereby said ridge increases the initial amount of expansion for tighter clamping and increased bulging and then provides excess material between said relief area portion and said tubular sleeve to counteract effects of wire-drawing for tighter filling of the sleeve within the workpieces.

6. A fastener as defined in claim 5 wherein said clamping ridge has a leading face forming an included angle on the order of thirty degrees with the longitudinal axis of said setting pin.

7. In a blind fastener for joining side-by-side workpieces having aligned holes for receiving the fastener, and having:

a tubular sleeve sized to fit through said holes and having a first head at one end for abutting against one side of the work pieces and having a locking recess therein, and an opposite end portion for projecting beyond the other side of the workpieces to be expanded into a second head on the said other side;

a setting pin extending through said sleeve for use in expanding said opposite end portion to clamp the workpieces together and for said second head, said setting pin having:

a central section extending through said sleeve;

a pulling section on one end of said central section adjacent said first head;

and an expanding head on the other end of said central section beyond said other end of said sleeve, to be drawn into said sleeve, said expanding head having an expansion section larger than said central section and the inside diameter of said sleeve, with a leading end adjacent said opposite end portion and locking groove between said central section and said leading end, and a tapered portion at the end of the expansion section opposite the central section and progressively increasing the diametric size of the expanding head in a direction away from the central section;

the improvement comprising:

a deformable clamping abutment ridge adjacent the leading end of said expansion section, said ridge having an outside diameter slightly larger than the outisde diameter of said expansion section and cooperating with said tapered portion to define a relief area portion of said expansion section between said ridge and said tapered portion and having an outside diameter slightly less than the outside diameter of said ridge, said ridge being formed from a material sufficiently hard for enlarging the sleeve beyond the holes to a size larger than said expansion section and for momentarily resisting entry of said expansion section into the portion of the sleeve within the workpieces, thereby to clamp the workpieces tightly together as the expanding head is drawn into the sleeve, and then being deformed and drawn off into the space between said expanding head and said tubular sleeve as the expansion section is drawn into the portion of the sleeve inside the holes.

8. A blind fastener as defined in claim 7 wherein said deformable clamping abutment means is formed on an annular collar which surrounds said setting pin, abuts a shoulder formed at the leading end of said expansion section and includes an annular skirt projecting forwardly of said expansion head overlying and projecting forwardly of said annular locking groove, a portion of said collar forming said clamping abutment means being deformable into said locking groove as said portion of said collar is drawn into said sleeve within said workpieces, and said skirt being deformable into said locking recess in said first head, thereby retaining said setting pin within said sleeve in the installed fastener.

9. A blind fastener as defined in claim 7 wherein said deformable clamping abutment means is formed on an annular collar which surrounds said setting pin and is compressed into said locking groove prior to being drawn into said sleeve, said collar further including an annular skirt projecting forwardly of said expansion head and being deformable into said locking recess in said first head, thereby retaining said setting pin within said sleeve in the installed fastener.

10. A blind fastener as defined in claim 9 wherein said collar further includes an annular rear portion coating said expanding head.

11. A blind fastener as defined in claim 8 or 9 wherein said collar is formed of a material which is at least as hard as said sleeve, but softer than said setting pin.

12. A blind fastener as defined in claim 11 wherein said collar is formed of ductile aluminum.

13. A blind fastener as defined in claim 8 or 9, wherein said locking recess includes locking means for cooperating with a setting tool having an inwardly directed bevel to initially deflect the leading end of said annular skirt inwardly and then to cause outward buckling of the skirt.

14. In a blind fastener for joining side-by-side workpieces having aligned holes of a first predetermined diameter for receiving the fastener, and having:
  a tubular sleeve having an outside diameter sized to fit through said holes and having a first head at one end for abutting against one side of the workpieces, and an opposite end portion for projecting beyond the other side of the workpieces to be expanded against the workpieces into a second head on said other side;
  a setting pin extending through said sleeve for use in expanding said opposite end portion to clamp the workpieces together and form said second head, said setting pin having:
    a central section smaller than the inside of said sleeve;
    a pulling section on one end of said central section extending beyond said first head;
    an expanding head on the other end of said central section beyond said other end of said sleeve, to be drawn into said sleeve, said expanding head having a cylindrical expansion section joined to said central section and larger than said central section and the inside diameter of said sleeve, formed with a tapered leading end adjacent said opposite end portion, said expansion section having an outside diameter that is less than the size of said holes by an amount equal to twice the wall thickness of said sleeve, to expand the sleeve into, and hold it in, tight engagement with the work pieces; and
    a tapered portion beyond said expansion section progresively increasing the size of said expanding head toward said other end, to form said second head on said sleeve;
  the improvement comprising:
  a deformable annular clamping ridge encircling the leading end portion of said expansion section, and having a tapered leading face forming an included angle of approximately thirty degrees with the longitudinal axis of the setting pin, and having a crest with an outside diameter that is larger than the diameter of said expansion section, thereby to resist entry of said expansion section into the portion of said sleeve within the workpieces, said clamping ridge being composed of the same material as said setting pin and being formed integrally thereon, said clamping ridge serving to expand the sleeve beyond the workpieces without substantial deformation of the ridge, and then being capable of deforming and being drawn off into the space between said expanding head and said tubular sleeve to permit the expansion section to enter and fill tightly the portion of the sleeve that is inside the workpieces.

15. In a fastener for joining two side-by-side workpieces having aligned holes of a predetermined size for receiving the fastener, the combination of:
  a tubular sleeve having an outside diameter smaller than said predetermined size for insertion through said holes;
  a setting pin extending through said sleeve and having an expanding head adjacent one end of the sleeve to be pulled into the latter;
  said expanding head having a generally cylindrical expansion section larger than the inside diameter of said sleeve, with a tapered leading end to expand the sleeve for clinching of the workpieces and tight filling of the holes, and having a taper beyond said expansion section for bulging the sleeve into a head against the workpieces; and
  an annular clamping ridge of the same material as said expansion section and integrally formed on the leading end portion of said expansion section, having a tapered leading face and a crest having a larger diameter than said expansion section, said ridge acting to expand the portion of said sleeve beyond the workpieces without substantial deformation of said ridge, and then being capable of deforming and being drawn off as the ridge is pulled into the portion of the sleeve within the workpieces, whereby said ridge increases the initial amount of expansion for tighter clamping and increased bulqing and then provides excess material between said expanding head and said tubular sleeve for tighter filling of the sleeve within the workpieces.

16. In a blind fastener for joining side-by-side workpieces having aligned holes of a first predetermined diameter for receiving the fastener, and having:
  a tubular sleeve having an outside diameter sized to fit through said holes and having a first head at one end for abutting against one side of the workpieces, and an opposite end portion for projecting beyond the other side of the workpieces to be expanded against the workpieces into a second head on said other side;
  a setting pin extending through said sleeve for use in expanding said opposite end portion to clamp the workpieces together and form said second head, said setting pin having:
    a central section smaller than the inside of said sleeve;
    a pulling section on one end of said central section extending beyond said first head;
    an expanding head on the other end of said central section beyond said other end of said sleeve, to be drawn into said sleeve, said expanding head having a cylindrical expansion section joined to said central section and larger than said central section and the inside diameter of said sleeve, formed with a tapered leading end adjacent said opposite end portion, said expansion section having an outside diameter that is less than the size of said holes by an amount equal to twice the wall thickness of said sleeve, to expand the sleeve into, and hold it in, tight engagement with the workpieces; and
    a tapered portion beyond said expansion section progressively increasing the size of said expanding head toward said other end, to form said second head on said sleeve;
  the improvement comprising:
  a deformable annular clamping ridge encircling the leading end portion of said expansion section, and having a tapered leading face forming an included angle of approximately thirty degrees with the longitudinal axis of the setting pin, and having a crest with an outside diameter that is larger than the diameter of said expansion section, thereby to resist entry of said expansion section into the portion of said sleeve within the workpieces, said clamping ridge being composed of a softer material than said setting pin and fixedly secured thereto as a coating, said clamping ridge serving to expand the sleeve beyond the workpieces without substan= tial deformation of the ridge, and then being capable of deforming and being drawn off into the space between said expanding head and said tubular sleeve to permit the expansion section to enter and fill tightly the portion of the sleeve that is inside the workpieces.

17. In a fastener for joining two side-by-side workpieces having aligned holes of a predetermined size for receiving the fastener, the combination of:
- a tubular sleeve having an outside diameter smaller than said predetermined size for insertion through said holes;
- a setting pin extending through said sleeve and having an expanding head adjacent one end of the sleeve to be pulled into the latter;
- said expanding head having a generally cylindrical expansion section larger than the inside diameter of said sleeve, with a tapered leading end to expand the sleeve for clinching of the workpieces and tight filling of the holes, and having a taper beyond said expansion section for bulging the sleeve into a head against the workpieces; and
- an annular clamping ridge of a softer material than said expansion section and fixedly secured thereto as a coating, having a tapered leading face and a crest having a larger diameter than said expansion section, said ridge acting to expand the portion of said sleeve beyond the workpieces without substantial deformation of said ridge, and then being capable of deforming and being drawn off as the ridge is pulled into the portion of the sleeve within the workpieces, whereby said ridge increases the initial amount of expansion for tighter clamping and increased bulging and then provides excess material between said head and said tubular sleeve for tighter filling of the sleeve within the workpieces.

* * * * *